3,595,952
STEAM CONDITIONING OF POLYAMIDE FILAMENT
Nolan Davidson Boyer and John Edward Hansen, Wilmington, Del., assignors to E. I. du Pont de Nemours and Company, Wilmington, Del.
No Drawing. Continuation-in-part of application Ser. No. 555,982, June 8, 1966. This application Apr. 5, 1968, Ser. No. 719,220
Int. Cl. B29c 25/00
U.S. Cl. 264—235
14 Claims

ABSTRACT OF THE DISCLOSURE

Polyamide monofilament is exposed to saturated steam at a pressure of 20 to 90 p.s.i.g. for 0.010 to 5 seconds to improve the knot strength of the monofilament.

---

This application is a continuation-in-part of application Ser. No. 555,982, filed June 8, 1966, and now abandoned.

This invention relates to polyamides, and more particularly, to treatment of monofilament thereof.

The prior art discloses numerous processes for the heat treatment (or annealing) of polyamide filament to increase the crystallinity and modify the properties thereof. For example, filament has been treated by continuous passage through a gaseous fluid or hot oil, or by exposure to saturated steam at atmospheric pressure on a batch basis in a steam chest. The atmospheric pressure steam treatment on running lengths of polyamide monofilament is disclosed in U.S. Pat. No. 3,003,222 to Pitzl. Surface melting of and the formulation of surface lumps on polyamide filament, using steam at a pressure of at least 105 p.s.i.g., is disclosed in British Pat. No. 1,037,935.

The present invention provides a continuous process for the treatment of polyamide monofilament with saturated steam. The present invention combines high pressure and short contact time in the treatment chamber to improve the properties of the filament. The embodiment of this invention wherein the filament is treated under relaxed conditions or under only small amounts of tension (as described herein) provides filament with an increased knot strength. Filament with high knot strength is useful, for example, as sewing thread and fishing line.

The process of the present invention comprises treating polyamide filament of a diameter in the range 3–75 mils by continually passing the filament through a chamber filled with satuarted steam, the steam being held at a pressure of about 12–90 p.s.i.g. within the chamber, but usually from 20–90 p.s.i.g. and more often from 40–90 p.s.i.g., at contact times in the range 10 milliseconds to 5 seconds. The temperature in the chamber is, therefore, at least 117° C. corresponding to the steam pressure of 12 p.s.i.g. or at least 126° C. or 141° C. corresponding to the 20 p.s.i.g. and 40 p.s.i.g. limits of operation, respectively. The upper pressure limit should be selected so that the corresponding temperature is less than the environmental melting point of the polyamide employed as indicated by X-ray analysis which does not show a decrease in orientation and by the retained smoothness (no surface lumps) of the surface of the filament. Absorbed water, just as conventional plasticizers, decreases the polymer melting point of the polyamide.

The polyamides which can be treated by the process of this invention are of fiber forming molecular weight and have a relative viscosity generally between 25 and 100 as determined by ASTM D789–62T, and include, for example, polycaprolactam, polyhexamethylene adipamide, and polyhexamethylene sebacamide; the polyamide from 1,4-(cis)-cyclohexane-bis(methylamine) and adipic acid as described in Bell et al. U.S. Pat. 3,012,994, issued Dec. 12, 1961; the polyamide from m-xylene-$\alpha,\alpha'$-diamine and adipic acid as described in Caldwell et al. U.S. Pat. 2,916,475, issued Dec. 8, 1959; the polyamide from 3,5-dimethylhexamethylene diamine and terephthalic acid; the polyamide from 2,5-dimethylpiperazine and adipyl chloride as described in Wittbecker, U.S. Pat. No. 3,143,527, issued Aug. 4, 1964; copolymers of polycaprolactam and polyhexamethylene adipamide; and copolymers of polyhexamethylene adipamide and polyhexamethylene sebacamide wherein the weight percentage of the latter monomer in the copolymer is up to 20 percent or over 80 percent.

The polyamide filament can optionally contain plasticizers, the amount and nature thereof depending upon the use contemplated for the filament. The plasticizers which are useful in modifying the polyamides in this invention are those which are compatible with polyamides, melt below 150° C. and boil above 200° C. Illustrative of useful plasticizers are 2-ethylhexanediol-1,3; tetramethylene sulfone; N-ethyl-toluene sulfonamide-(o,p); p-toluene sulfonamide; di-n-butyl maleate; n-butyl tartrate.

The filament to be treated herein can be produced using any of the conventional drawing techniques. The filament to be treated usually has a draw ratio of at least 3.0 and preferably at least 3.5 (draw ratio is weight of a unit length before drawing divided by weight of same unit length after drawing). The filament can have a diameter in the range 3–75 mils. The largest property improvements are achieved when the filament diameter is in the range 5–40 mils.

According to the process of this invention, the polyamide filament can be treated with saturated aqueous vapor which is at a pressure in the range 12–90 p.s.i.g. Generally, with polyhexamethylene adipamide and polyhexamethylene sebacamide homopolymers, pressures near 80 p.s.i.g. are preferred. With polycaprolactam homopolymers, pressures of 50–60 p.s.i.g. are preferred. Preferably, the water content (water entrained in liquid form) of the steam is from at least 2 percent based on the weight of steam vapor plus liquid water. The upper limit on water content depends only on the entraining capacity of the steam under the conditions employed. Typically, however, the water content will not be greater than 80 percent by weight. Generally, the water content will be in the range of 5 to 60 percent by weight and more often from 20 to 50 percent by weight.

The contact time of the filament in the chamber can be in the range 10 milliseconds to 5 seconds, but more often will be in the range 150 milliseconds to 5 seconds. The ratio of the speed of the roller at the exit of the steam tube to that of the roller at the entrance to the steam tube is spoken of herein as the "speed ratio." Thus, with a speed ratio of 1.0, the speeds of the two rollers are equivalent, whereas with a speed ratio of less than 1.0, the filament is undergoing relaxation. Conversely, where said ratio is greater than 1.0, the filament is being stretched during treatment.

According to the process of this invention, the speed ratio can vary in the range 0.85–1.15. When the speed ratio is in the range of about 0.85–1.05, the process of the present invention induces an improvement in the knot (and loop) strength of the filament as compared with that of the filament not treated by this process. This phenomenon makes the product especially useful as sewing thread and fishing line.

Striking improvements in knot strength are achieved with polyamide filament of 5–40-mil diameter which is treated at especially short contact times (10 milliseconds to 1 second) at 50–80 p.s.i.g., and at a speed ratio of about 0.90–1.05.

The apparatus employed in the process of this invention can be a steam tube or chamber of any design which permits the maintenance of an environment of high-pressure saturated aqueous steam on the filament as it continuously passes through that chmaber. Thus, it is generally desired to employ a tube, the construction of which minimizes pressure leakage from the chamber, for example, one wherein the filament entrance and exit ports are of a cross-sectional area only silghtly larger than the cross-sectional area of the filament being passed therethrough.

Illustrative of the steam tubes in which pressure of saturated steam can be maintained on the filament is one which consists of an outer jacket or pipe and an inner tube with a plurality of openings along the length of the latter. Steam is pressured into the space between the outer pipe and inner tube, and passes through the openings, impinging on a filament which continuously enters and exits at either end of the inner tube. The openings in the wall of the inner tube can be drilled into the tube wall so that the gaseous fluid impinges on the filament. Steam, of course, will escpae at either end of the tube, but this effect can be minimized as noted above.

The steam tube employed in the examples below was of this design. It was composed of ½ inch stainless steel pipe (for confining steam) over an inner stainless tube with a 125-mil outside diameter and 55-mil inside diameter. The inner tube had a plurality of ⅟₁₆ inch openings drilled radially along its length. Steam was admitted into the outer jacket and passed trough the openings, impinging on the filament which entered and exited at the ends of the tube. The outer pipe was 33 inches long, the inner tube was 36 inches long. At the entry end of the tube there was a stainless steel trumpet to prevent snagging of the filament as it entered the tube.

The physical properties of the filament reported below were determined by the following methods on filament which had been stored at 230 C. and 50 percent relative humidity for at least 2 days after treatment according to this process. The tensile strength for a filament having a diameter (D) in inches and a break load (BL) in pounds as measured on an Instron University Tensile Tester using a 10-inch gap (filament segment) and drawing at 10 inches per minute at 23° C. and 50 percent relative humidity was calculated by Equation 1:

(1)     Tensile strength (in p.s.i.) $= 4BL/\pi D^2$

Ultimate elongation was determined from the Instron Chart by dropping a perpendicular from the break point to the time axis of the chart, then measuring the distance (C') along the time axis from the point where said perpendicular hits the axis to the beginning of the loadtime curve, calculating ultimate elongation by Equation 2, wherein L is an initial gage length in inches and $m$ is a chart magnification (ratio of chart speed to speed of jaw separation):

(2)     Ultimate elongation (in percent) $= 100C'/Lm$

Tensile modulus was measured on an Instron universal tester using a 10 inch gap, but drawing at a rate of 1 inch per minute instead of 10 inches per minute as done above. Tensile modulus is calculated by Equation 3, wherein C is distance on the Instron chart in inches and P is the load in pounds at that point:

(3)     Tensile modulus (in p.s.i.) $= 4PmL/\pi D^2 C$

Knot strength (or knot tenacity in grams per denier) was measured by tying an open overhand knot of the filament, suspending the knot at a point equidistant between the clamps in an Instron universal tensile tester, pulling the knot tight within the tester until the knot failed, then following the procedure herein described for the determination of tensile strength. Loop strength (or loop tenacity in grams per denier) was measured similarly after looping one length of thread inside another and suspending the loop at a point equidistant between clamps of the tester.

Density of the filament was determined in a density gradient tube employing carbon tetrachloridetoluene as the liquid system.

In order that the invention may be better understood, the following detailed examples are given in addition to the examples already given above. All percentages herein are expressed by weight unless otherwise noted.

EXAMPLE 1

The filament which was treated in Example 1 was a 10-mil filament of polyhexamethylene adipamide having a relative viscosity of 43 which had been manufactured in a single-stage operation at a draw ratio of 4.0. The initial properties thereof are found in the table under A.

This filament was passed over a roller through a steam chamber containing saturated steam (water content of about 5 percent by weight at the inlet to the chamber) and pulled from the chamber by a roller spinning at the same rate as the roller at the entrance to the steam chamber. Therefore, the rollers are spoken of as having a "speed ratio" of 1.0. The contact time of the filament in the chamber was 1 second. The physical properties of filament after treatment (Example 1) are found in the table. Steam having the water content used in this example was also used for the experiments of Examples 2–16.

X-ray diffraction measurements on the treated filament were made and the separation ($\Delta d$) of the (100) singlet and the (010, 110) doublet lattice spacings of the triclinic crystalline modification was determined at the skin of the filament and at the core of the filament.

The peak separation as a function of distance from the center of the filament was measured with a Philips Microcamera which had a collimated X-ray beam with a 0.002-inch diameter. The filament was sectioned parallel to its axis with a razor blade and the section mounted in the microcamera over the beam collimator with the use of an optical microscope, so that the collimated X-ray beam passed through the desired portion of the sample. $\Delta d$ was calculated according to Equation 4:

(4)     $$\Delta d = \frac{\lambda}{4} \left( \frac{\operatorname{ctn} \theta}{\sin \theta} \right) \frac{\Delta r}{f \sec^2 2\theta}$$

wherein $\lambda$ is the wavelength of the CuK$\lambda$ radiation (1.4518 A.) $f$ is the sample to filament distance, $r$ is the radius of the diffracted line, and $\theta$ is the diffraction angle of the line. The values of $2\theta$ and $\theta$ are the average values of the (100) singlet and the (010, 110) doublet peaks, and can be taken as 21.5° and 10.75°, respectively.

Prior to treatment, the peak separation ($\Delta d$) was found to be 0.45 at the skin and 0.43 at the core. After treatment $\Delta d$ and 0.67 at the skin and remained 0.43 at the core. Density of the filament was 1.1397 prior to treatment and 1.1441 after treatment.

EXAMPLES 2–6

In Examples 2–6 the monofilament before treatment was composed of polyhexamethylene adipamide having a relative viscosity of 40–45 and containing 13 percent N-ethyl-p-toluene sulfonamide plasticizer. The filament had been drawn at a ratio of 4.5. In Examples 2–4 the filament diameter was 11 mils, in Examples 5 and 6 it was 8 mils. See the table for process conditions and properties of the 11-mil filament before (B) and after treatment, and of the 8-mil filament after treatment (5–6).

EXAMPLES 7–10

In Examples 7–10 the untreated monofilament was 16-mil filament of a copolymer of 90 percent polyhexamethylene adipamide and 10 percent polycaprolactam having a relative viscosity of 40–45 and containing 8 percent N-ethyl-toluene sulfonamide-(0,p) plasticizer. The untreated filament had been drawn in two stages with drawn ratios of 4.25 and 1.18, respectively. The table shows the physical properties of this filament before (C) and after (7–10) the treatment specified in the table.

EXAMPLES 11-13

The untreated filament of these examples was 20-mil monofilament of polycaprolactam containing 0.076 percent of a yellow fluorescent dye and produced in at two-stage draw operation, the first stage at a draw ratio of 4.25 at 30° C. and the second at a draw ratio of 1.22 at 172° C.

See the table for process conditions and physical data on the filament before (D) and after treatment.

EXAMPLES 14-16

The untreated filament was a 10-mil monofilament of polyhexamethylene sebacamide having a relative viscosity of 30 and which had been drawn in a single stage at a ratio of 4.0.

Physical data on the starting filament, the process conditions, and data on the product are found in the table. The density of the filament before treatment (E) was 1.0864, that of the treated filaments as follows: Example 14, 1.0875; Example 15, 1.0883; Example 16, 1.0865.

TABLE

| Example | Steam pressure (p.s.i.g.) | Time (sec.) | Speed ratio | Tensile modulus (p.s.i.) | Tensile strength (p.s.i.) | Ultim. elong. (percent) | Loop strength (p.s.i.) | Knot strength (p.s.i.) | K.S./T.S.[2] |
|---|---|---|---|---|---|---|---|---|---|
| 1 | 90 | 1.0 | 1.0 | 518,000 | 68,200 | 35.2 | | 67,700 | 0.96 |
| A | | | | 710,000 | 70,900 | 24.2 | | 41,000 | 0.59 |
| 2 | 80 | 0.1 | 1.0 | 333,000 | 71,100 | 22.4 | 51,000 | | |
| 3 | 80 | 0.1 | 0.95 | 299,000 | 82,900 | 37.4 | 64,000 | | |
| 4 | 80 | 0.1 | 0.90 | 246,000 | 83,000 | 39.8 | 73,200 | | |
| 5 | 80 | 0.1 | 1.0 | 287,000 | 87,700 | 35.7 | 70,500 | | |
| 6 | 80 | 0.1 | 0.90 | 254,000 | 80,300 | 30.7 | 66,300 | | |
| B | | | | 385,000 | 77,800 | 16.6 | 21,300 | | |
| 7 | 50 | 1.0 | 1.0 | 222,000 | 85,500 | 34.9 | | 72,800 | 0.85 |
| 8 | 50 | 5.0 | 1.0 | 208,000 | 86,700 | 35.8 | | 74,300 | 0.89 |
| 9 | 50 | 5.0 | 0.90 | 164,000 | 80,000 | 48.2 | | 68,100 | 0.85 |
| 10 | 50 | 1.0 | 0.90 | 172,000 | 85,600 | 47.4 | | 69,500 | 0.81 |
| C | | | | 351,000 | 96,500 | 18.0 | | 47,700 | 0.49 |
| 11 | 60 | 0.5 | 1.0 | 211,000 | 94,600 | 27.0 | | 76,500 | 0.81 |
| 12 | 70 | 0.5 | 1.05 | 242,000 | 102,000 | 28.2 | | 73,100 | 0.72 |
| 13 | 70 | 0.1 | 0.95 | 214,000 | 99,900 | 29.1 | | 70,500 | 0.71 |
| D | | | | 282,000 | 97,500 | 20.3 | | 45,500 | 0.47 |
| 14 | 80 | 0.42 | 1.0 | 585,000 | 61,600 | 32.5 | | 58,600 | 0.95 |
| 15 | 80 | 2 | 1.0 | 610,000 | 65,100 | 34.1 | | 62,200 | 0.96 |
| 16 | 80 | 1 | 1.10 | 616,000 | 64,400 | 32.5 | | 64,700 | 1.0 |
| E | | | | 635,000 | 65,100 | 25.6 | | 51,200 | 0.785 |

[1] Letters refer to filament before treatment according to the process.
[2] K.S./T.S. is the ratio knot strength to tensile strength.

In the process of the present invention the crystallinity and physical properties (density, ultimate elongation, etc.) of polyamide filament are enhanced by exposure of the filament for short contact times to high pressures of saturated steam. Saturated steam functions in this process both as a polymer-penetrating chemical agent and as a heat-transfer medium. Both water concentration and temperature exert a strong effect on rates of crystallization of polyamide filament.

The following examples illustrate the benefit of increasing water content of the steam.

EXAMPLE 17

In this example, the monofilament after drawing to a draw ratio of 4.4 is 19 mil in diameter and is composed of a copolymer of 90 percent by weight of polyhexamethylene adipamide and 10 percent by weight of polycaprolactam and 13 percent by weight (based on total weight) of N-ethyl-p-toluene sulfonamide plasticizer, having a relative viscosity of about 45. The steam treatment equipment consisted of a 32 inch long reactor, ½ inch in diameter, having openings of 0.035 inch × 0.25 inch at each end, containing steam at a pressure of 60 p.s.i.g. The monofilament is passed through the length of the reactor at a speed ratio of 0.9 to give a contact time of 0.15 second and 0.30 second for separate samples of the monofilament. Using steam containing about 20 percent by weight of water, the monofilament exhibited a knot tenacity of 2.25-2.96 grams per denier and a knot efficiency (knot tenacity divided by tenacity) of 0.55 to 0.72. Using steam containing about 45 percent water by weight, the knot tenacity was increased to 3.4 to 4.0 grams per denier and a knot efficiency of 0.85 to 9.99. The variation in water content of the steam was obtained by water jacketing varying lengths of the line supplying saturated steam to the reactor.

EXAMPLE 18

In this example, essentially the same procedure and monofilament was employed as in Example 17, but using a speed ratio of 0.90 and a steam pressure of 80 p.s.i.g. and, except that in one run, dry saturated steam was used. For that run, the loop efficiency (loop tenacity divided by tenacity) was about 50 percent, which was some improvement over the loop efficiency of the monofilament before steam treatment. When wet steam was used (water content of about 20 percent by weight) the loop efficiency increased to 75 to 90 percent. The tenacity of the monofilament remained substantially unchanged by the steam treatment.

EXAMPLE 19

In this example, essentially the same procedure as Example 17 was followed, except that the monofilament was of polycaprolactam having 8 percent by weight of unpolymerized monomer, a relative viscosity of 55, and measured 12 mil in diameter and was made at a draw ratio of 5.2. The steam pressure was 70 p.s.i.g. and contact time of the monofilament within the reactor was 0.2 second at a speed ratio of 0.95. Runs were made using steam of different water contents, leading to the following results.

| Water content of steam (percent by weight): | Knot efficiency |
|---|---|
| 4 | 0.44 |
| 25 | 0.67 |
| 50 | 0.77 |
| 75 | 0.77 |

The knot efficiency increases with increasing water content up to 50 percent water by weight, and thereafter no increase in knot efficiency was observed. The tenacity of the monofilaments was substantially unchanged by the steam treatment.

It is generally recognized that the density of a semi-crystalline filament is dependent upon the temperature at which it is annealed. The higher the annealing temperature, generally the higher the density increase induced. After annealing for a certain duration dependent upon sample thickness, the density becomes essentially independent of the duration of annealing.

X-ray measurements were employed to ascertain the effect of the process of this invention on polyamide filament. A polyhexamethylene adipamide filament was used for this purpose. When a filament of polyhexamethylene adipamide is drawn initially (prior to heating and annealing), a substantial fraction of the crystallinity therein is of the pseudohexagonal form, which manifests itself as a rather broad diffraction peak. Superimposed upon the diffraction peak due to the pseudohexagonal form are sharper diffraction peaks due to a triclinic crystalline modification of polyhexamethylene adipamide. It is common practice to measure the separation of the (100) singlet and the (010, 110) doublet lattice spacing of the triclinic crystalline modification. The separation of these lattice spacings is very small due to crystalline disorder in the untreated filament. Heat treatment (annealing) will cause the amount of the pseudohexagonal form to decrease and that of the triclinic form to increase, resulting in greater triclinic peak separation.

In the present process the short contact time, i.e., the annealing step, is so rapid that unusual skin-core effects (as described below) are achieved. The X-ray peak separation at the periphery (skin) and at the core of the polyhexamethylene adipamide filament were measured. The process was found to have induced largely a surface effect. Thus, treatment of a 10-mil polyhexamethylene adipamide filament at 90 p.s.i.g. for a 1 second contact time increased the crystallinity of the outer part of the filament (the skin), while no change in the crystallinity of the core of the filament was noted. It is believed that the increase in crystallinity at the surface is a manifestation of the relaxation process which improves the crystalline order of the filament surface and that this surface relaxation may be responsible for the marked increase in knot strength.

As many apparently widely different embodiments of this invention may be made without departing from the spirit and scope thereof, it is to be understood that this invention is not limited to the specific embodiments thereof except as defined in the appended claims.

What is claimed is:

1. A process for the continuous treatment of drawn polyamide monofilament of diameter 3–75 mils with a saturated steam under pressure, said process comprising passing said filament through a pressure chamber in the presence of saturated steam and pulling said filament from said chamber at a ratio of output to input linear speeds in the range 0.85–1.15, said filament being in said chamber for a contact time in the range 10 milliseconds to 5 seconds, said saturated steam being at a pressure of 12–90 p.s.i.g. within the chamber, which corresponds to a temperature which is less than the melting point of the polyamide filament under the process conditions.

2. A process according to claim 1 wherein the polyamide is polycaprolactam.

3. A process according to claim 1 wherein the polyamide is polyhexamethylene adipamide.

4. A process according to claim 1 wherein the polyamide is polyhexamethylene sebacamide.

5. A process according to claim 1 wherein the polyamide is a copolymer of polycaprolactam and polyhexamethylene adipamide.

6. A process according to claim 1 wherein the polyamide is a copolymer of polyhexamethylene adipamide and polyhexamethylene sebacamide, said copolymer containing up to 20 percent or over 80 percent of polyhexamethylene sebacamide.

7. A process according to claim 1 wherein the diameter of said filament is 5–40 mils, the pressure of said saturated steam is 50–80 p.s.i.g., and the speed ratio is in the range of about 1.05–1.15.

8. A process according to claim 1 wherein the speed ratio is in the range of about 0.85–1.05, whereby the knot strength of said filament is improved.

9. A process according to claim 8 wherein the diameter of said filament is 5–40 mils, the pressure of said saturated steam is 50–80 p.s.i.g., the speed ratio is in the range of about 0.90–1.05 and the contact time of the filament within the pressure chamber is 10 milliseconds to 1 second.

10. The process according to claim 1 wherein said saturated steam has a water content of at least 2 percent by weight.

11. The process according to claim 1 wherein said water content is 4 to 80 percent by weight.

12. The process according to claim 1 wherein the pressure of said saturated steam is 20–90 p.s.i.g.

13. The process according to claim 1 wherein the pressure of said saturated steam is 40–90 p.s.i.g.

14. The process according to claim 11 wherein said monofilament has a draw ratio of at least 3.0.

References Cited

UNITED STATES PATENTS

| | | | |
|---|---|---|---|
| 3,003,222 | 10/1961 | Pitzl | 264—342 |
| 3,303,169 | 2/1967 | Pitzl | 57—140X |
| 2,807,863 | 10/1957 | Schenker | 264—342 |
| 2,985,995 | 5/1961 | Bunting et al. | 264—342 |
| 3,069,836 | 12/1962 | Dahlstrom et al. | 264—342 |
| 3,199,281 | 8/1965 | Maerov et al. | 264—342 |
| 3,225,534 | 12/1965 | Knospe | 264—342 |
| 3,307,962 | 7/1967 | Hardy | 117—7 |
| 3,423,809 | 1/1969 | Schmitt | 264—103X |
| 2,794,700 | 6/1957 | Cheney | 264—346 |
| 2,846,752 | 8/1958 | Lessig | 28—59.5 |
| 3,118,154 | 1/1964 | Osban et al. | 264—342 |
| 3,156,750 | 11/1964 | Ouculo | 264—342 |
| 3,177,555 | 4/1965 | Clapp et al. | 28—72 |
| 3,443,009 | 5/1969 | Chirgnin | 264—342 |
| 3,452,131 | 6/1969 | Geerdes et al. | 264—290 |

JAY H. WOO, Primary Examiner

U.S. Cl. X.R.

264—290, 342, 346; 28—76